Feb. 27, 1945.　　　J. L. EHRETSMAN ET AL　　　2,370,296
STEAM TRAP VALVE MECHANISM
Filed Nov. 26, 1943　　　3 Sheets-Sheet 1

Inventors:
John L. Ehretsman
and Richard W. Leutwiler,
by Rummler Rummler & Davis
Attorneys.

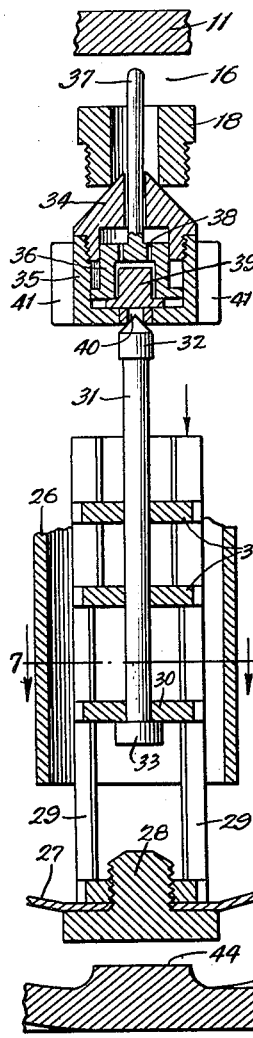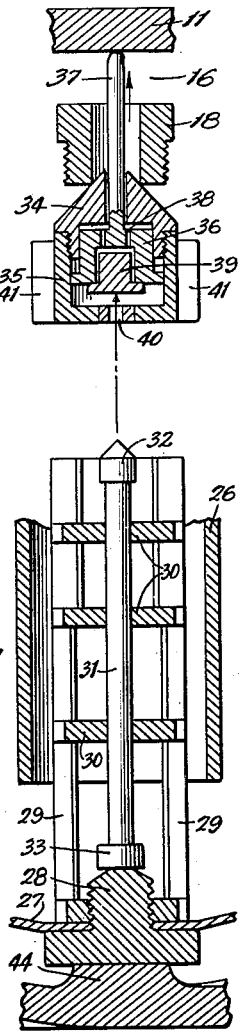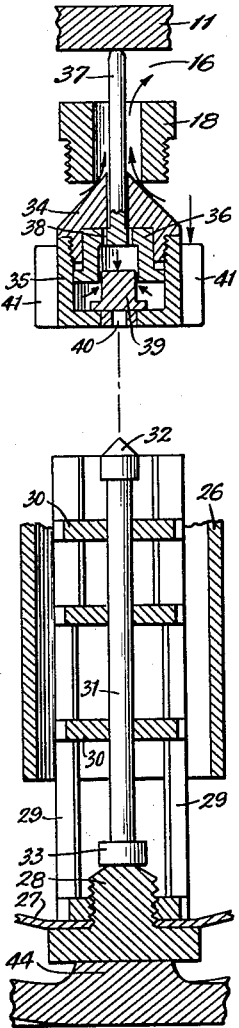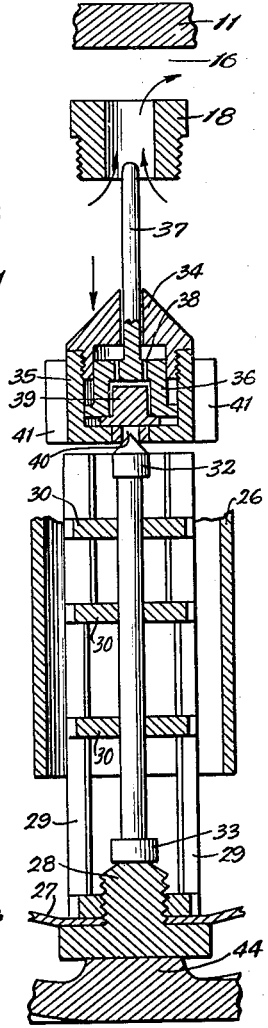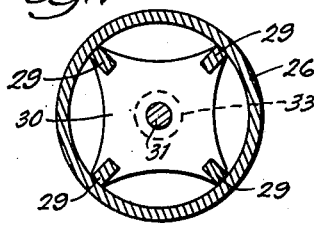

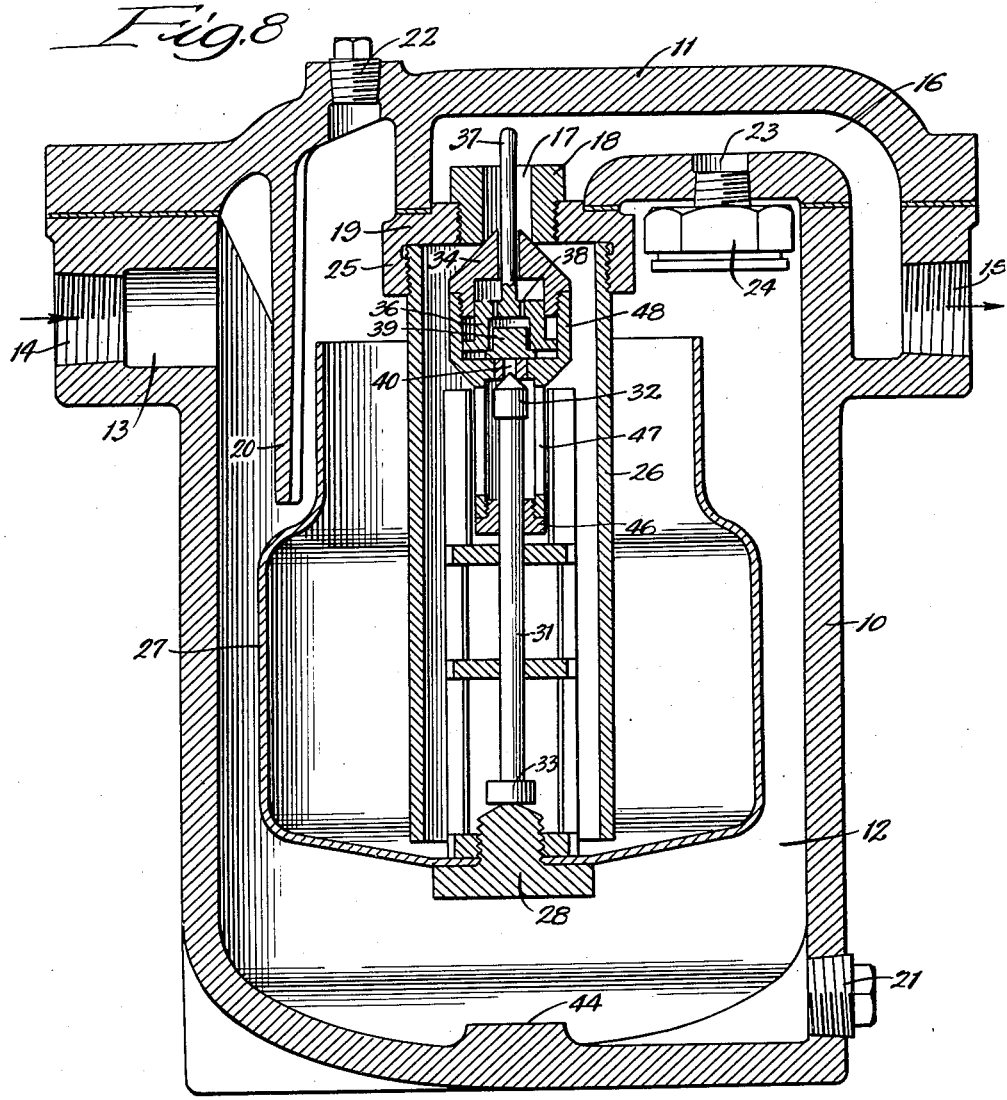

Patented Feb. 27, 1945

2,370,296

UNITED STATES PATENT OFFICE 2,370,296

STEAM TRAP VALVE MECHANISM

John L. Ehretsman and Richard W. Leutwiler, Chicago, Ill., assignors to The Illinois Engineering Company, Chicago, Ill., a corporation of Illinois Application November 26, 1943, Serial No. 511,780

6 Claims. (Cl. 137—103)

This invention relates to traps of the type commonly known as steam traps which are employed for separation of liquids from vapors and gases under pressure.

In general, a steam trap is a device applied to or connected to the drain opening of a pipe line, a vessel or chamber containing steam, to drain or remove accumulated condensate, air and other non-condensible gases from such pipe line, vessel or chamber without permitting the passage of steam.

The present invention relates particularly to improvements in the outlet valve operating mechanism and, for the purpose of illustration, the improvements are shown in connection with a steam trap of the general construction shown and described in the patent of John F. McKee and Douglas B. Wright, No. 1,610,871, patented December 14, 1926, and with a thermostatic air vent of the general type illustrated and described in Patent No. 2,095,506, patented October 12, 1937, to Leutwiler and Eichholz. Such traps may also be used with slight modification to drain condensate from pipe lines, vessels or chambers containing compressed air or gases and for the removal of water of condensate or other liquids from lighter fluids, such as gasoline or naphtha.

The main objects of the present invention are to provide an improved form of outlet valve operating mechanism whereby the pressure influencing the valve is equalized at opposite sides of the valve at the time that it is opened, so as to facilitate the opening of the valve and greatly increase the range of pressures and delivery capacities for which any particular size of trap may be employed; and to provide an improved form of such operating mechanism comprising a fluid pressure actuated jack for overcoming the resistance to unseating of the valve on its opening operation.

More specific objects of this invention are to provide an improved valve operating construction whereby, within practical limits, the following advantages are obtained:

(a) Any diameter of outlet valve seat orifice may be used.

(b) Any required capacity of delivery in pounds of condensate per hour may be obtained.

(c) For any diameter of compound seat orifice, the capacity in pounds of condensate per hour will vary with the pressure.

(d) Fewer sizes of traps with smaller physical dimensions and less weight are required for specified capacities and pressure ranges.

(e) The improved trap construction will eliminate the necessity of changing valve seats in traps when operating pressures are changed.

In the drawings:

Figs. 3, 4, 5 and 6 are corresponding fragmentary sectional views of the outlet valve operating mechanism showing successive positions of the various moving parts in the operation of opening the valve, Fig. 3 showing the valve fully closed and Fig. 6 showing it fully open.

Fig. 7 is a sectional detail taken on the line 7—7 of Fig. 3 and showing how the pilot valve stem guide is in turn guided by the standpipe which delivers liquid to the outlet valve.

Fig. 8 is a sectional view corresponding to Fig. 1 but showing a modified form of the valve operating mechanism.

Figure 1:
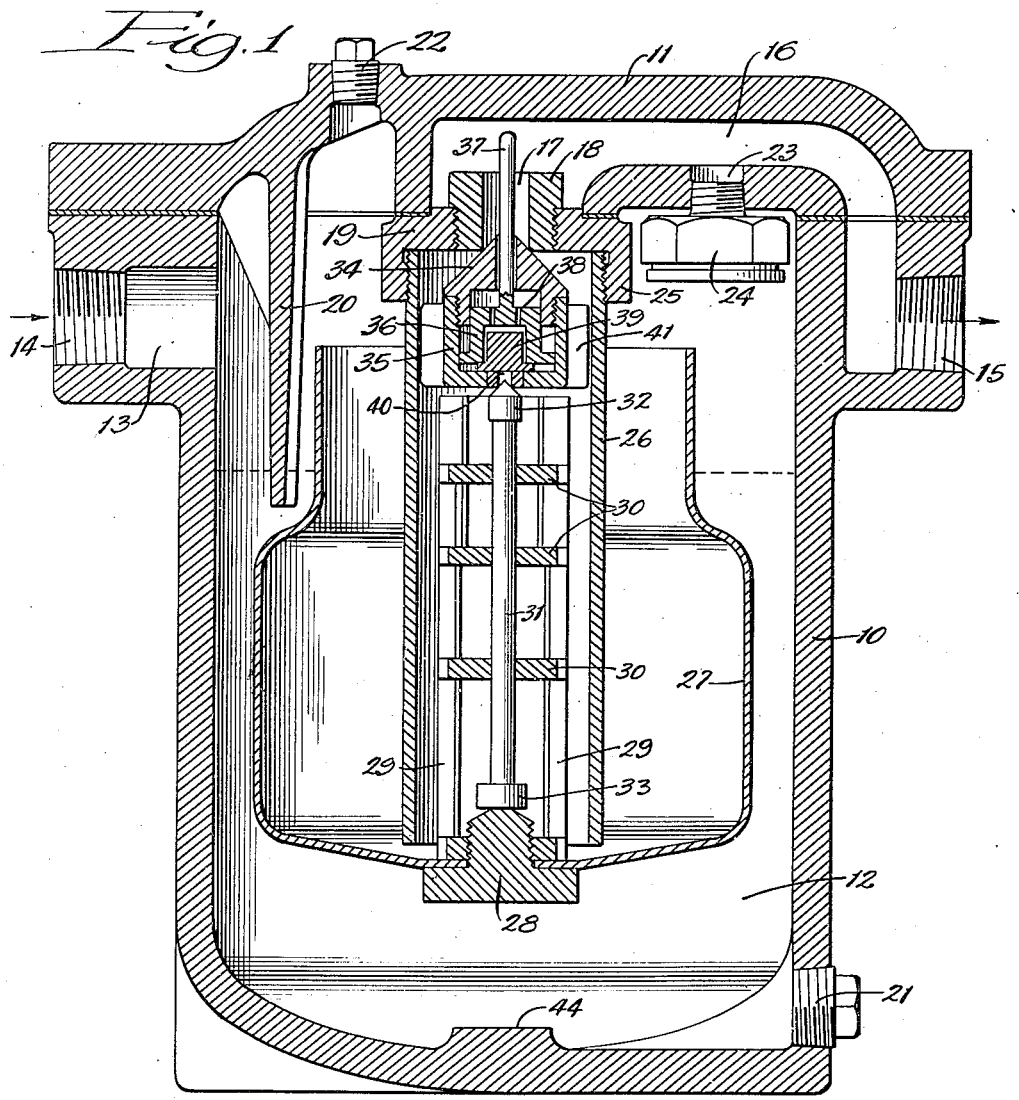
Figure 1 shows in vertical section one form of trap and outlet valve operating mechanism embodying the present invention.

In the form shown in Figures 1 and 3 to 7 inclusive, the trap body or casing 10 and cover 11 form a closed chamber 12 for collecting the condensate and housing the valve operating mechanism.

The chamber 12 is provided with an inlet port 13 threaded at 14 for connection with the pipping system that is served by the trap. The body 10 has a tapped outlet 15 to which may be connected a waste pipe and there is an outlet passage 16, formed partly in the cover casting 11 and partly in the wall of the body 10, leading from the outlet 15 to an outlet orifice 17 in a fitting in the form of a replaceable plug 18 carried by a bridge member 19 which is bored and threaded to receive the plug 18, as shown, so that the axis of the orifice 17 is vertical.

The cover 11 is so formed that the outlet passage 16 is completely isolated from the chamber 12 except when communication is established through the orifice 17. The cover 11 carries a baffle or splash plate 20 whereby liquid entering from the inlet 13 is deflected to the lower part of the chamber 12.

The body 10 has a clean-out plug 21 in one side near the bottom and the cover also preferably has a plug 22 for connecting an external vent or an external balance pipe.

In suitable location, at a point on the cover between the outlet passage 16 and the chamber 12, there is a vent passage 23 fitted with a thermostatic vent 24 which will allow the escape of air from the upper part of the chamber 12 but prevent the passage of steam as described in said Patent No. 2,095,506.

The bridge 19 has formed thereon, concentrically with the orifice 17, an internally threaded collar 25 which serves as a carrier for a standpipe 26 which is open at its lower end and extends downwardly to a point near the bottom of the bucket float 27 when the latter is in its uppermost position, as shown in Fig. 1.

The float 27 has a stud 28 in its bottom to which is fastened a guide post 29 which is of skeletal form and consists of appropriate upright and transverse members so arranged as to be guided by the inside walls of the standpipe 26, for guiding the float 27, see Fig. 7, and the cross members 30 are centrally bored to receive and guide the stem 31 of a pilot valve 32. The parts of the guide post 29 are so formed as to offer but little resistance to the free flow of liquid through the standpipe 26. The stem 31 has a head 33 at its lower end which provides shoulders for engaging the stud 28 or the cross piece 30 to limit its relative movement with respect to the guide post 29.

To control the flow of liquid through the outlet orifice 17 in accordance with the present invention, there is a compound valve comprising a main outlet valve 34 in the form of a conical valve head threaded into a hollow body 35 which serves as a hydraulic jack cylinder and cooperates with a piston 36 having a stem 37 that extends upwardly through the head 34 to a point near the top wall of the passage 16 in the cover 11, which wall serves as an abutment, to take the thrust of the stem 37 to unseat the compound valve. The valve stem 37 is of less diameter than the bore in the valve head 34 for the free passage of air or liquid above the piston 36. The piston 36 is provided with ports 38 that are controlled by a loose plug or valve member 39. The lower head of the jack cylinder 35 has a central port 40 that is controlled by the pilot valve 32.

In Figures 1 and 3 to 6 inclusive, the valve 34 is guided by wings 41 which loosely engage the inner wall of the standpipe 26.

Figure 2:
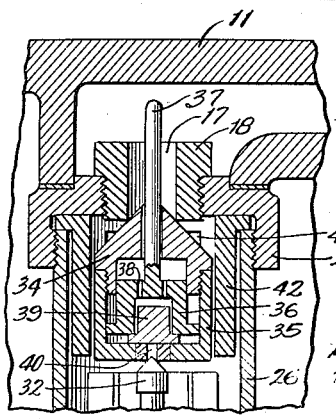
Fig. 2 is a fragmentary detail of a portion of the valve operating mechanism with a slightly modified form of guide means for the outlet-valve body.

In Figure 2 the compound valve structure is the same as in Figure 1 except that the valve is guided by a gland-like sleeve or thimble 42 mounted at the top of the standpipe 26 instead of having integral guide wings 41. This sleeve is of skeletal structure to provide passages 43 and offer a minimum of obstruction to the free flow of water to the outlet port 17 from the interior of the standpipe 26.

The operation of the device shown in Figures 1 and 3 to 7 inclusive is as follows:

It will be understood that the inlet 13 is connected to a piping system, such as a steam heating or power system in which, during operation, there is an accumulation of condensate flowing by gravity to the trap chamber 12. Initially the trap will be cold and the thermostatic vent 24 will have its air escape passages open, permitting the escape of air and preventing the accumulation of an air lock which might exclude the entrance of steam or condensate into the trap. With no steam pressure in the vessel and with the trap discharge open to the atmosphere, the condensate and air will flow into the trap, through it, and out through the condensate discharge orifice 17 and the thermostatic air vent 24. Under these conditions the float will be filled with water and remain at rest at the bottom of the trap chamber.

As soon as steam reaches the thermostatic vent 24, its passages close as is well known, hence the structure and operation of this thermostatic vent device need not be herein described in detail. When there is steam pressure above the condensate in the trap, the pressure on the liquid around the standpipe 26 will force the column of liquid in the standpipe to rise and discharge through the orifice 17 until the float rises carrying with it the compound valve to close the orifice 17. The parts are then in the relation in which they are shown in Figure 1 where the outlet orifice 17 is closed by the main outlet valve 34 and the hydraulic jack port 40 is closed by the pilot valve 32. The compound valve is held tightly closed by the differential pressure, i. e., the pressure difference between the inlet and outlet of the trap.

The deflector or splash plate 20 prevents the inflowing condensate from falling directly into the bucket float as the movement of the float is limited to a range wherein it is always shielded by the splash plate 20.

Continued inflow of condensate into the chamber 12 causes its surface level to rise above the rim of the float 27 and to fall into the float. When the buoyancy of the float assembly in the surrounding condensate is overbalanced by the combined weight of the float assembly and the liquid in its interior, it falls by gravity, more condensate flows in and the float comes to rest on the boss 44 at the bottom of the chamber 12. During its fall, a shoulder on the guide post 29, which in the form shown is the lowermost cross member 30, strikes the head 33 of the stem 31, as shown in Fig. 3, and by impact unseats the pilot valve 32 admitting liquid at the pressure of the steam system through the pilot port 40 and into the interior of the jack cylinder 35. Since the spaces in the cylinder 35 above the piston 36 and its port valve 39 are open to the pressure of the outlet passage 16, the hydraulic pressure in the chamber 12 will lift the jack piston and push the stem 37 into contact with the cover 11, whereupon continued movement of the piston 36 with respect to its cylinder 35 will thrust the cylinder downwardly and release the valve 34 from its seat in the outlet orifice 17 where previously it had been held by the pressure of the steam within the chamber 12.

The positions of the parts of the valve actuating mechanism are shown in sequence in Figs. 3 to 6 inclusive. Figure 4 shows the positions of the pilot valve 32 and of the float 27 and guide post 29 just prior to the opening of the main valve 34.

As soon as the valve 34 opens, it will fall by gravity to the position in which it is shown in Figure 6 and in the course of its fall, as shown by Fig. 5, the pressures above and below the jack piston 36 will become equalized and the plug valve 39 will fall to the bottom of the cylinder 35, as shown in Fig. 5, opening escape ports through the piston and allowing the piston to settle to the lower limit of its stroke within the cylinder 35, as shown in Fig. 6.

The standpipe 26 will always be filled with liquid to the level of the orifice plug 18. This condition is assured by the fact that the length of the standpipe 26 and the buoyancy of the float are so related and proportioned that the water level in the float will never fall below the lower end of the standpipe 26 and, therefore, there will always be a liquid seal to prevent steam or air under pressure from entering the standpipe 26. That is to say, when the valve 34 opens and the float 27 rests on the boss 44, the pressure of the steam in the upper part of the chamber 12, upon the liquid surrounding the standpipe 26, will force the liquid up through the standpipe and out through the orifice 17 and the outlet passage 16 in a continuous stream until the weight of liquid in the float is insufficient to hold it submerged, whereupon the float will rise and cause the valve 34 to close the outlet orifice 17, restoring the parts to the position in which they are shown in Figure 1. This rising of the float will occur before the level of the liquid in the float reaches the bottom of the standpipe 26 and the standpipe will accordingly always remain filled with liquid, due to the barometric relation of the standpipe 26 with respect to the body of water surrounding its lower end.

The compound valve remains open so long as condensate is supplied to the trap at a rate equal to, or greater than, the capacity of the outlet nozzle at the pressure of the system. With a trap of appropriate capacity, under normal operating conditions, the discharge rate exceeds the rate of condensate supply and the trap operates intermittently as described.

It will be observed that the outlet orifice 17, the valve 34, the piston 36, stem 37, piston valve 39, pilot port 40, pilot valve 32, stem 31, float 27, and guide post 29—30, are all alined with the axis of the standpipe 26 and that each of these moving parts is symmetrically formed with respect to that axis. Thus the weight of each part is balanced with respect to its path of movement along the standpipe and friction is minimized. The sequential positioning of the parts along this axis results in perfect timing of the automatic functions thereof due to movements of the float.

In the form shown in Fig. 8, the parts that are identified by the same reference numerals as are employed in Figures 1 to 6 inclusive are identical counter-parts in form and function, but instead of having the outlet valve 34 guided on the walls of the standpipe 26, it is guided by a guide collar 46 on the stem 31 of the pilot valve 32. The guide collar 46 is connected by skeleton arms 47 with the cylinder 48 of the hydraulic jack.

In the foregoing description of operation, it has been assumed that the pressure at the outlet of the trap is atmospheric. The trap will however function equally well at any outlet pressure, above, at or below atmosphere, provided that the corresponding inlet pressure is in excess of the outlet pressure.

It is important to note that in former traps, where the outlet orifice is controlled by a single valve, instead of the compound valve of the present invention, there is a definite limiting relation between the area of the seat orifice, the shape and weight of the float assembly, and the pressure in the trap.

With the present invention, there is no such closely limiting relation of design sizes because each size of trap is quite independent of pressure, due to the fact that the pilot orifice can be very small and the equalizing piston of the jack can be larger than the largest size of orifice used. Thus a few traps of widely different capacities will serve all purposes and many special sizes of orifice fittings and valves can be eliminated.

In general, the present invention increases the capacity, i. e., the number of pounds of condensate per hour which a trap will discharge throughout the whole pressure range, because only the pilot valve, and not the main outlet valve, is opened by the weight or impact of the float acting against the steam pressure on the valve.

One function of the compound valve is to simplify the problem of designing a series of traps, to reduce sizes and weights of parts and to eliminate the use of many orifices of various diameters formerly required for a given pressure range.

A further advantage of the present invention is that, in the majority of situations, a change of operating pressure or required capacity in a particular system equipped with such a trap will not require replacement of the orifice with one of different size.

Although several specific embodiments of the invention are herein shown and described, it will be understood that numerous details of the constructions shown may be altered or omitted without departing from the spirit of the invention as defined by the following claims.

We claim:

1. A compound valve, comprising a body having a head adapted to close an orifice, a jack cylinder within said body, a jack piston movable in said cylinder, a stem for said piston extending through said head, a port in said body at the end opposite from said head and leading to said cylinder, and a pilot valve controlling said port.

2. A compound valve, comprising a body having a head adapted to close an orifice, a jack cylinder within said body, a jack piston movable in said cylinder, a stem for said piston extending through said head, a pilot port in said body at the end opposite from said head and leading to said cylinder, a pilot valve controlling said pilot port, an equalizing port in said piston, and a normally open by-pass valve controlling said equalizing port and adapted to be closed by pressure adjacent said pilot port.

3. A compound valve, comprising an axially vertical jack cylinder body having its upper head of valve form for closing an orifice by differential pressures at opposite sides of said orifice, a jack piston within said jack cylinder body, a stem extending upward from said piston and through said upper head, said cylinder having a lower head provided with an axial inlet port, a pilot valve controlling said inlet port, a pressure equalizing port in said piston, a valve controlling said equalizing port, being adapted to close said port by pressure at said pilot valve port and being adapted to open by gravity when pressures above and below it are equalized, and said piston being adapted to fall by gravity when pressures above and below it are equalized and to close said equalizing port valve at the lower limit of its stroke.

4. Trap valve mechanism comprising a casing having a chamber, an outlet orifice therefor, an outlet valve for said orifice adapted to be held normally closed by pressure within said chamber, a fluid pressure actuated jack acting on said valve to open the same, said jack comprising a cylinder fixedly connected to said outlet valve and a piston in said cylinder having a stem adapted to bear on said casing, a port leading from said chamber to said jack cylinder, and a pilot valve controlling said port.

5. A trap valve mechanism, comprising a casing having an outlet orifice, a valve body normally seated on said orifice by pressure in said casing, said body having a hydraulic jack cylinder in its interior, a piston in said cylinder, a piston stem extending from said cylinder through said outlet orifice, a port in said valve body between said cylinder and said casing, a pilot valve controlling said port, a pressure equalizing passage through said piston, a normally open valve for said passage adapted to be closed by pressure of fluid entering said cylinder from said port, and an abutment on said casing coacting with said piston stem to unseat said valve body from said orifice.

6. A trap valve mechanism, comprising a casing having an outlet orifice, a valve body normally seated on said orifice by pressure in said casing, said body having a hydraulic jack cylinder in its interior, a piston in said cylinder, a piston stem extending from said cylinder through said outlet orifice, a port in said valve body between said cylinder and said casing, a pilot valve controlling said port, a pressure equalizing passage through said piston, a valve for said passage adapted to be normally opened by gravity and closed by pressure of fluid entering said cylinder from said port, and an abutment on said casing coacting with said piston stem to unseat said valve body from said orifice.

JOHN L. EHRETSMAN.
RICHARD W. LEUTWILER.